(12) United States Patent
Vandensande

(10) Patent No.: US 7,636,410 B2
(45) Date of Patent: Dec. 22, 2009

(54) MULTIPLEX BUS SYSTEM WITH DUTY CYCLE CORRECTION

(75) Inventor: Geert Maria Marcel Vandensande, Heverlee (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1293 days.

(21) Appl. No.: 10/360,436

(22) Filed: Feb. 7, 2003

(65) Prior Publication Data
US 2003/0154418 A1 Aug. 14, 2003

(30) Foreign Application Priority Data
Feb. 11, 2002 (EP) .................................. 02290332

(51) Int. Cl.
*H04L 7/00* (2006.01)
(52) U.S. Cl. ....................................... 375/355; 327/172
(58) Field of Classification Search ................. 375/355, 375/377, 354; 327/172, 175
See application file for complete search history.

(56) References Cited

U.S. PATENT DOCUMENTS

| | | | | |
|---|---|---|---|---|
| 5,367,200 A | * | 11/1994 | Leonida | 327/33 |
| 5,412,698 A | * | 5/1995 | Van Brunt et al. | 375/373 |
| 5,614,855 A | * | 3/1997 | Lee et al. | 327/158 |
| 5,757,218 A | * | 5/1998 | Blum | 327/175 |
| 6,917,656 B2 | * | 7/2005 | Fuhrmann et al. | 375/355 |
| 2002/0017950 A1 | * | 2/2002 | Shimoda | 329/364 |
| 2002/0044618 A1 | * | 4/2002 | Buchwald et al. | 375/355 |
| 2002/0196883 A1 | * | 12/2002 | Best et al. | 375/355 |
| 2004/0091273 A1 | * | 5/2004 | Brissette et al. | 398/175 |

* cited by examiner

Primary Examiner—Chieh M. Fan
Assistant Examiner—Freshteh N Aghdam
(74) Attorney, Agent, or Firm—Barnes & Thornburg LLP

(57) ABSTRACT

The present invention is related to a method for treating a digital signal within a protocol handler which is part of a module coupled to a multiplex bus. The method consists in detecting the duty cycle of the digital signal, and in modifying said digital signal so that the modified signal contains the same data, but has a duty cycle of approximately 50%.

1 Claim, 5 Drawing Sheets

MULTIPLEX BUS SYSTEM WITH DUTY CYCLE CORRECTION

FIELD OF THE INVENTION

The present invention is related to multiplex bus systems for communicating digital messages between modules coupled to said bus, in a time division multiplexing mode The invention is particularly suited for in-vehicle networking applications.

STATE OF THE ART

Multiplex buses are commonly used in automotive, industrial and telecom applications in order to reduce the cost of wiring between the modules or nodes on the bus. A bus system can comprise one or more wires, and operates according to an established network protocol. For in-vehicle networking, the best known protocols of this kind are CAN which is the abbreviation of Controller Area Network, VAN which is the abbreviation of Vehicle Area Network, SAE J1850 and LIN which is the abbreviation of Local Interconnect Network.

Modules on such a bus are equipped with devices such as transceivers, UART blocks, etc. for treating incoming and outgoing signals which are basically sequences of high and low voltage, corresponding to 0 and 1 binary values or vice versa. Said treatment mainly comprises transforming an incoming analog signal into a block wave, sampling said signal with a given frequency in order to detect the exact sequence of 0 and 1 which is being sent, decoding said sequence and translating it into a useable command.

The duty cycle of a received signal is an important parameter. The ideal duty cycle for minimum errors during the A/D conversion and the subsequent decoding is 50%, i.e. in a high-low cycle, the 'high' state is as long as the 'low' state. However, due to a number of factors, the duty cycle of a received signal may vary broadly. Among these factors are asymmetry in the delay of the transmitter of the sending node, slope difference between the falling and the rising edge, difference in low and high level of different nodes, threshold level of the receiver, asymmetry in the delay of the receiver, difference in ground-potential or supply-voltage between the different nodes.

This creates a potential risk of errors in the decoding of received messages, especially when taken in conjunction with inaccurate sampling during A/D conversion. In every node, an oscillator is present, to provide a variable sample clock frequency, with which to sample and thereby reconstruct the incoming block wave. To reduce costs, the oscillators used are however not always very accurate and the sample frequency may be subject to errors of up to 2% accuracy after synchronisation of the sample frequency to the synch-field. As will be explained with reference to the drawings, the combination of a reduced duty cycle and a deviation from the ideal sampling frequency may quickly lead to errors in the decoding process. A particular problem is thereby the communication between 2 slave nodes equipped with inexpensive RC-oscillators or fully internal oscillators. As a consequence of the above mentioned inaccuracy, this communication will then become difficult or impossible: the tolerance on the sample frequency of the 2 slaves has to be added together and may easily exceed 2%.

Because of these phenomena, there has been a trend in the prior art to impose stricter accuracy constraints on the transceivers of multiplex bus nodes, in particular on parameters such as slope-control, maximum allowed ground shift, etc. This is however a technically complex and costly solution to the problem at hand. The same is true for the introduction of expensive ceramic or crystal oscillators, instead of the currently applied RC oscillators.

AIMS OF THE INVENTION

The present invention aims to provide a multiplex bus system wherein the probability of errors in the decoding is lower, without necessitating stricter requirements on the transceivers, present in the nodes of such a system, or on the accuracy of the sampling frequency. This invention is consequently aimed at facilitating a low complexity and low cost slave to slave communication.

SUMMARY OF THE INVENTION

The present invention is related to a transmission system comprising a data bus, and a plurality of modules coupled to said data bus, said modules comprising a transceiver, a Medium Access Control device used at least for sampling an incoming signal, a supervisor device used at least for determining a sampling frequency and producing a sample signal at said frequency, an oscillator, characterized in that in at least one of said modules, said supervisor device further comprises a duty cycle determining device adapted to determine the duty cycle of said incoming signal and said Medium Access Control device comprises a duty-cycle correcting device adapted to correct said duty cycle thereby producing a corrected signal. According to the preferred embodiment, said Medium Access Control device is a UART device.

The invention is further related to a method for processing a signal, comprising the steps of:
- transforming said signal into a first block wave, representing a sequence of high and low states, a high state corresponding to a first binary, value, a low state corresponding to a second binary value,
- sampling said block wave with a first sample signal having a sample period equal to $\Delta t$,
- deriving from at least a part of said first block wave, the duty cycle of said first block wave,
- producing a second block wave, which represents the same sequence of high and low states as said first block wave, and wherein at least a part of said second block wave has a duty cycle close to 50%,
- sampling said second block wave with a second sample signal,
- applying further steps of treating said block wave including the step of decoding said message.

In the preferred embodiment, said signal comprises a synchronization field, said synchronization field comprising a number of cycles of a high state followed by a low state or vice versa, and said method comprises the steps of:
- After sampling said first block wave with said first sample signal, deriving the number, of samples (n) corresponding to a predefined number of high states of said synchronization field and the number of samples (m) corresponding to a predefined number of low states of said synchronization field, wherein said predefined number is called 'x',
- calculating from said numbers n and m, the duty cycle of said first block wave,
- If n<m, delaying each high to low transition relative to the previous low to high transition in at least a part of said first block wave, with a time equal to $$\frac{m-n}{2 \cdot x} \cdot \Delta t,$$

thereby producing said second block wave,

If n>m, delaying each low to high transition relative to the previous high to low transition in at least a part of said first block wave, with a time equal to $$\frac{n-m}{2 \cdot x} \cdot \Delta t,$$

thereby producing said second block wave.

The invention is more particularly related to the transmission system of the invention, wherein the method of the invention is applied in at least one module. The invention is equally related to a module intended to be coupled to a digital data bus, said module comprising a transceiver, a Medium Access Control device used at least for sampling an incoming signal, a supervisor device used at least for determining a sampling frequency and producing a sample signal at said frequency, an oscillator, characterized in that said supervisor device further comprises a duty-cycle determining device adapted to determine the duty cycle of said incoming signal and further characterized in that said device used for sampling a signal, comprises a correcting device adapted to correct said duty cycle to thereby produce a corrected signal.

According to the preferred embodiment, in the module of the invention, the method of the invention is applied.

Preferably, in the module of the invention, said Medium Access Control device is a UART device.

SHORT DESCRIPTION OF THE DRAWINGS

DETAILED DESCRIPTION OF THE INVENTION

Figure 1:
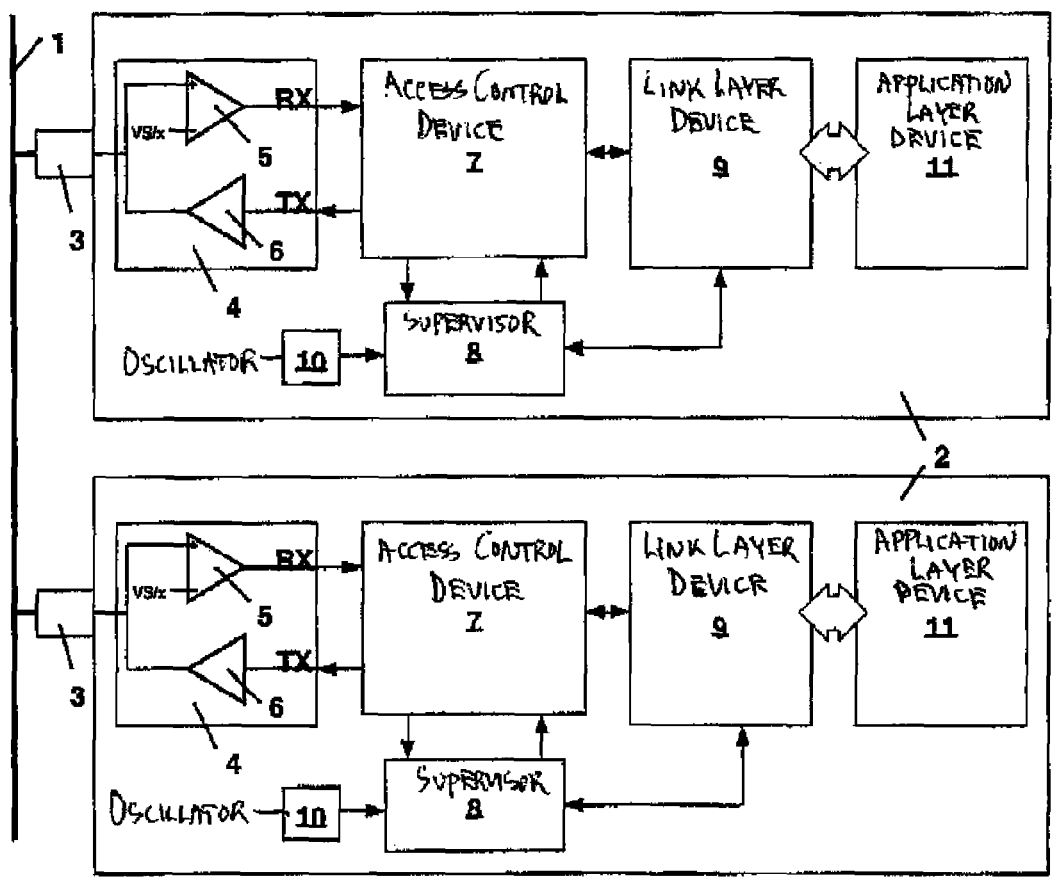
FIG. 1 represents a view of a bus system with the indication of the different blocks.
Figure 2A:
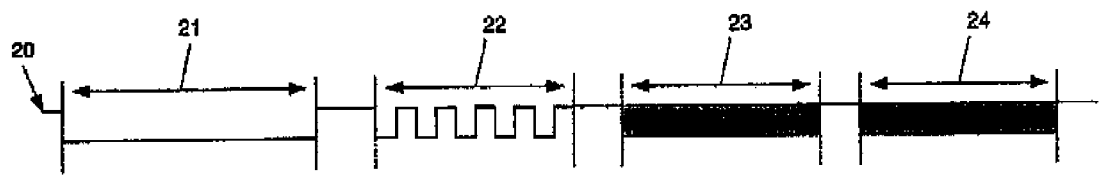
FIG. 2a represents a digital message comprising a number of subparts.

In order to situate the invention, a system which is known in the prior art will be first described in more detail. FIG. 1 shows a bus system, consisting of the bus 1 itself, for instance a one-wire bus, such as a LIN or CAN bus, to which a number of modules or nodes 2 are coupled via connectors 3. As is known, one or more of these nodes may act as master, while the others may act as slaves. A master module is generally able to send command messages to the slaves, which are equipped to receive and interpret these messages and possibly send out a limited number of control or confirmation data themselves, for instance within the command message of the master. Reference is made to FIG. 2a, which shows a typical message structure, explained in detail further in the text: subblocks 21, 22, 23 are always sent by the master, subblock 24 is sent by the master or is a response by a slave. Within this communication, the communication data-rate is defined by the master frequency. All the slaves will synchronise to the master frequency to reconstruct the message. Every node on the bus comprises a transceiver 4, which comprises itself a comparator 5, for producing a well-conditioned digital receive signal RX, on the basis of an incoming message, and a transmitter 6, which may put a message on the bus, based on a well-conditioned digital send signal TX.

RX and TX are respectively treated and prepared by the so called Data Link Layer devices 7 and 9. Among them, device 7, the MAC or Medium Access Control device, will sample the incoming data RX and group this data into words. These words are passed to device 9, the LLC or Logical Link layer device. In prior art systems, a UART device is generally used to perform the function of the MAC-layer device. The LLC 9 is generally used for the parity check, checksum validation, data encapsulation/decapsulation and the message filtering based on the identifier. This LLC device will also indicate to a supervisor device 8 when the last data-field has arrived. Device 11 is the application layer device, responsible for identifier interpretation and command decoding. Device 8 acts as a supervisor and will synchronise the different devices after detecting a break field at the start of a message. The supervisor 8 is also responsible for the synchronisation of the sampling frequency based on the information of the synch-field. Therefore every node comprises an oscillator 10, which may be an RC-oscillator. Its clock-frequency is used as basic clock for the node. The sampling-frequency is derived from this clock and as such the stability or drift of the oscillator clock directly determines the stability or drift of the sampling frequency. The present invention is related to the MAC and supervisor block, devices 7 and 8.

A receive and/or transmit message normally comprises several parts, as is generally standardized by a protocol. An example of a message according to the LIN protocol is illustrated in FIG. 2a. The signal shown corresponds to a complete message, comprising a number of sub-parts 21 to 24, explained further. This is to be regarded as the receive message as it is produced by the comparator 5, at which point it appears as a block wave, with a given duty cycle. The duty cycle, which is visible in the sub-part 22, depends on the characteristics of the transceiver and other parameters. As this message is received from the bus, this incoming signal is not a perfect block wave, but a succession of high and low states with a slope between the two, whether it concerns a transition from high to low or vice versa. In the comparator 5, these transitions are detected and reference levels for high and low states are employed, so as to approximate the perfect block wave shown in FIG. 2a. Duty cycle variations are due to uncertainties on parameters as the high-low or low-high slope, the reference level, and the delays between a detection of a reference level and the actual transition in the block wave.

In the examplary block wave of FIG. 2a, the 'high' state 20 corresponds to the inactive state of the bus, i.e. no signal is being sent or received. When the level drops to 'low', this indicates that a message has arrived. The start of a message is therefore indicated by a long 'low' break field 21 of a given time span, followed by a synchronization field 22, which is a sequence of 4 high-low cycles having a given frequency, i.e. a number of bits per second, one bit corresponding to a high or a low state. After that, the identifier field 23 and the data field or checksum-field 24 follow, which comprise the bits (0 and 1) which are to be decoded, And which arrive with the same frequency as the synch field 22.

Figure 2B:
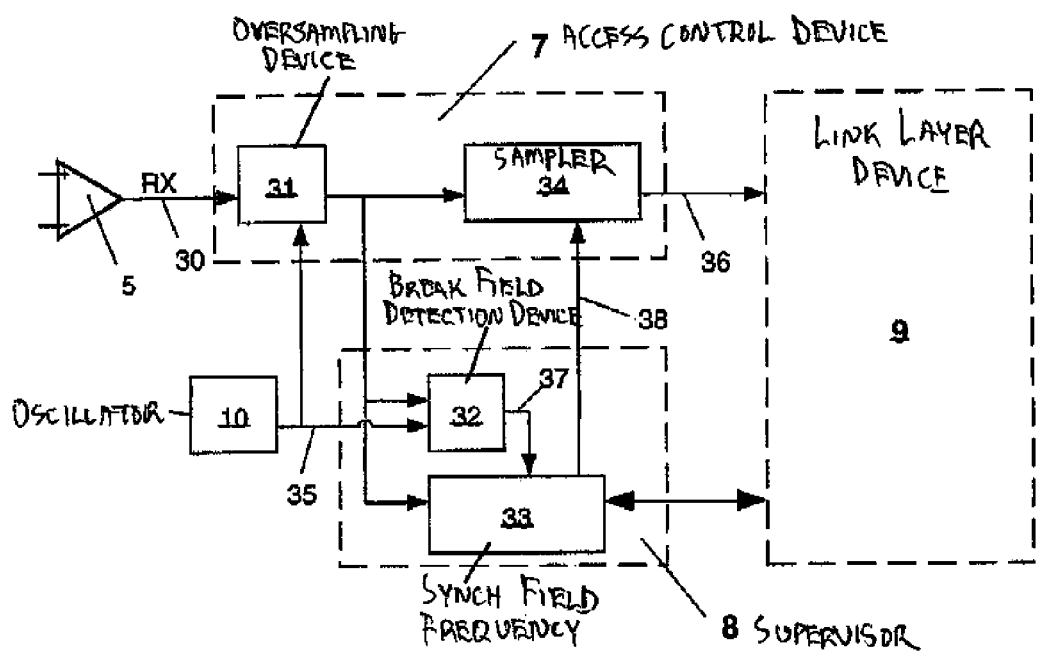
FIG. 2b represents the building blocks of a module according to the prior art.

FIG. 2b illustrates part of a prior art module including a prior art comparator 5 of a prior art transceiver (not shown in FIG. 2b), prior art MAC-device 7 and prior art supervisor device 8. Not all subblocks of the prior art module are depicted e.g. the blocks related to TX are omitted from the figure. Signal 30 is an RX signal received by this node on the bus, and processed by comparator 5, and corresponding to a message as shown in FIG. 2a. Oversampling device 31 carries out an oversampling of the incoming signal, with the help of a local high frequency sampling signal 35, as produced by the oscillator 10. This oversampling device 31 which synchronises the signal 30 to the internal clock 35 could also contain a spike-filter to improve the performance of device 33 which will be described later. Spikes are short transitions to one or zero caused by disturbances on the bus. Block 32 is the break field detection device. The detection of the break-field indicates the start of a new message. All other devices like 33, 34 and LLC device 9 are synchronised to this start. An internal break signal 37, produced by device 32, is transmitted to device 33. Block 33 represents a device used for calculating the synch field frequency (number of bits per second in the synch field) and for generating a sample signal 38, at the synch field frequency. In device 34, the output-signal of block 31 is sampled with the frequency of signal 38, which is ideally producing one sample during every bit time of the incoming signal, i.e. during every bit being sent. These samples are next grouped in words of 8 bits (36) and further passed to the LLC device 9.

Figure 3:
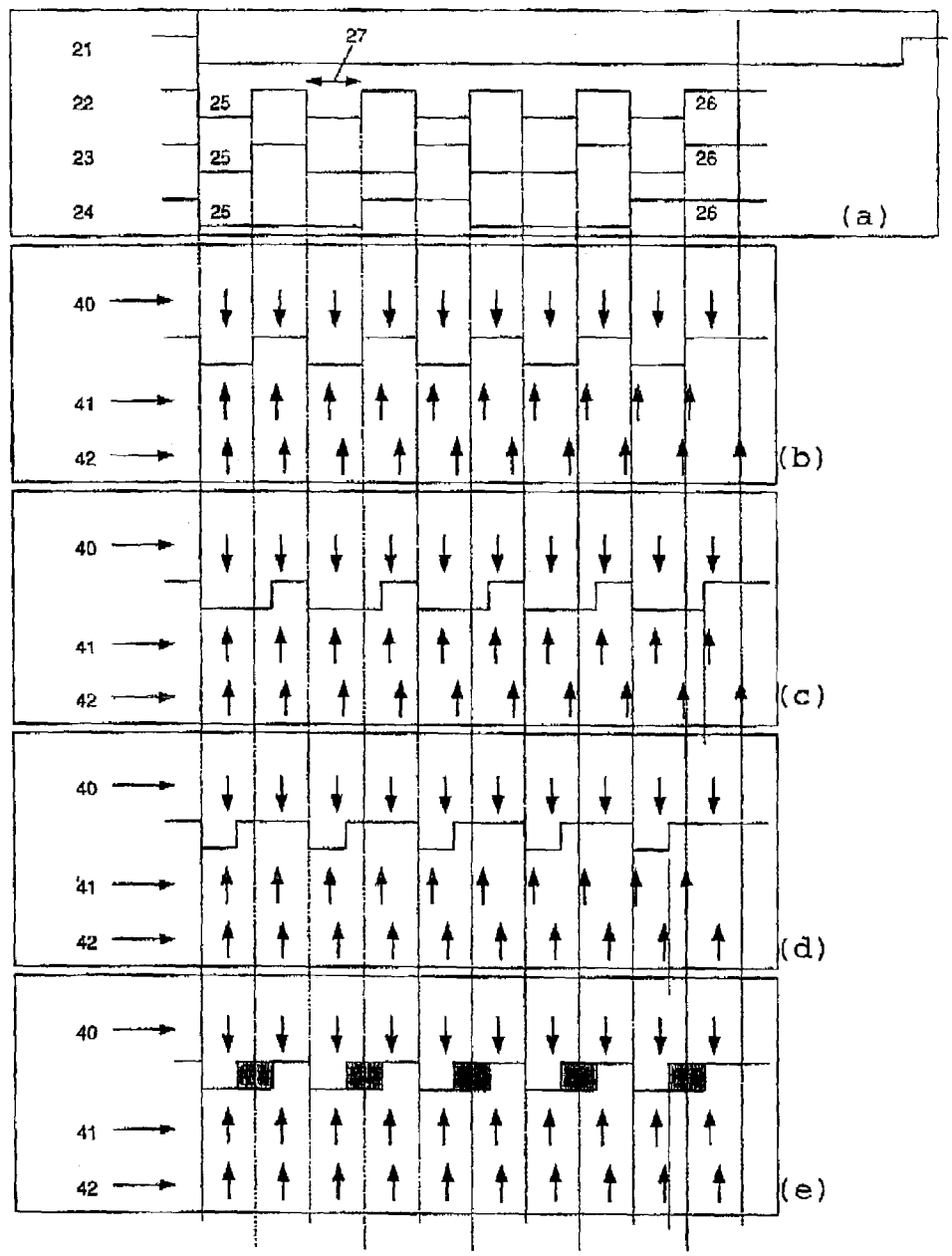
FIG. 3 illustrates the error probabilities as a consequence of duty cycle variations and sample clock inaccuracies.

FIG. 3 illustrates the influence of both the sample clock accuracy (signal 38 of FIG. 2b, signal 40, 41 or 42 in FIG. 3)and the duty cycle. FIG. 3a recapitulates the sub-parts of the signal: break field 21, synch field 22, identifier field 23, data field or checksum field 24. The bit-time 27 is determined by the clock of the sender of the data. According to the LIN protocol, synch field 22, identifier field 23 and data field or checksum field 24 are each preceded and followed by a start bit 25 and stop bit 26 respectively. According to the same protocol, every field consists of 10 bit-times (27) but due is to a duty-cycle error the bit-time 27 will deviate from the period of the ideal sampling frequency 40. FIG. 3b illustrates the condition wherein the received signal's duty cycle is 50%. The ideal sampling frequency (signal 40, corresponding to sampling signal 38 in FIG. 2b) causes the selection of a sample in the middle of each received bit time. The combination of this ideal sample frequency with a 50% duty cycle will always yield the correct binary value, as is apparent from the figure. In a practical situation a deviation of the sample frequency is allowed up to 2%. The maximum and minimum allowed sample frequencies are illustrated by signals 41 and 42. Sampling the signal having a 50% duty cycle at these frequencies will still yield the correct binary values of 8 consecutive bits.

FIGS. 3c and 3d illustrate the effect of a duty cycle which is respectively lower (FIG. 3c) and higher (FIG. 3d) than 50%. In every case, signals 41 and 42 indicate the allowable maximum and minimum sample frequency. It can be seen that a deviation from 50% duty cycle causes a restriction of the allowable range of the sample frequency. For a duty cycle of less than 50% (FIG. 3c), the maximum allowable sample frequency 41 has to stay closer to the ideal sample frequency 40. In the case of a duty cycle of more than 50% (FIG. 3d), the minimum allowable sample frequency 42 is allowed less deviation from the ideal sample frequency 40. FIG. 3e combines the two effects.

From the above it can be concluded that in order to avoid possible mismatch between the sample signal 38 (40, 41, 42) and the received signal (21 to 24), it is either necessary to reduce the sample clock inaccuracy to a minimum, and/or to keep the duty cycle of the incoming signal as close as possible to 50%. The first option requires the use of expensive oscillators such as ceramic or crystal oscillators. The present invention offers an inexpensive and straightforward alternative to the latter option by maintaining the duty cycle on the incoming signal close to 50% under all circumstances.

Figure 4:
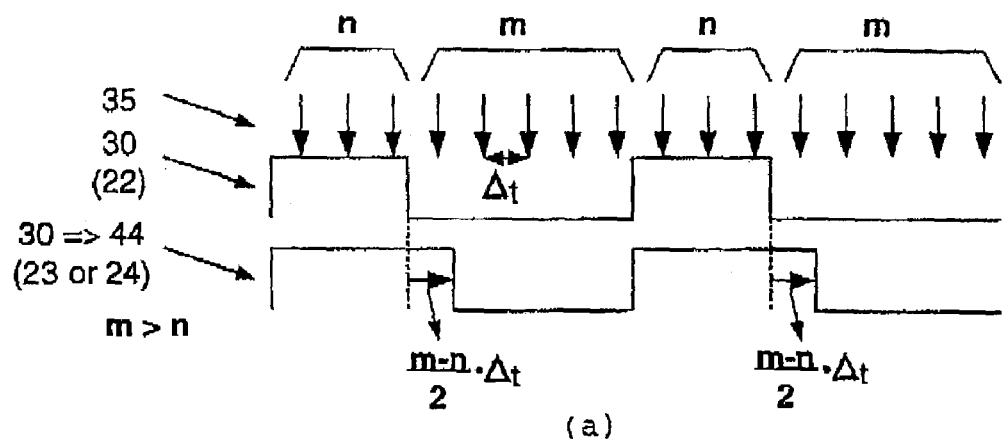
FIG. 4 illustrates the method of correcting an incoming signal according to the invention.
Figure 4:
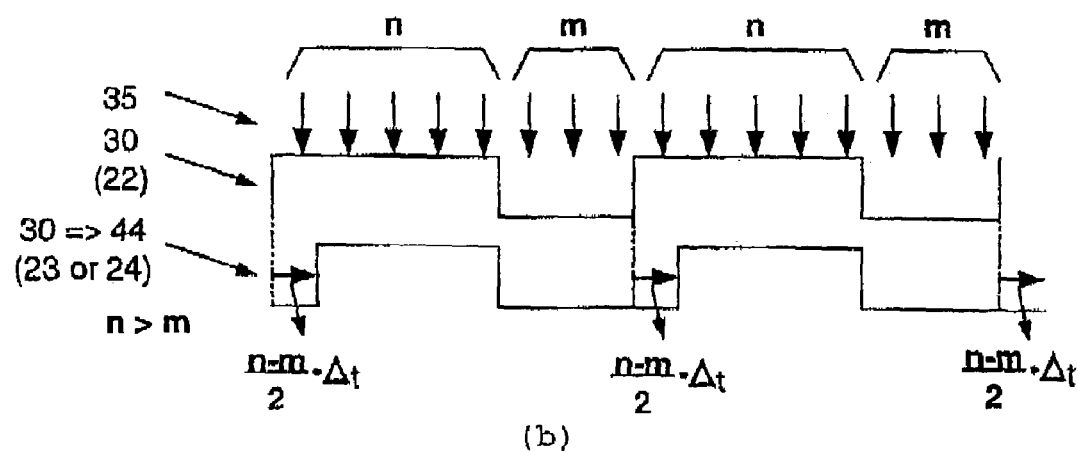

FIGS. 4a and 4b illustrate the operation performed by a node according to the invention, for an incoming signal with a duty cycle of less than 50% and more than 50% respectively. Based on the oversampling in block 31, by signal 35 of the synch field 22, the number of samples 'n' corresponding to a 'high' state and the number of samples 'm' corresponding to a 'low' state in one cycle are determined The following algorithm is then performed:

If m>n, delay every 'high to low' transition relative to the previous 'low to high' transition in at least a part of the message with a time equal to $$\frac{m-n}{2} \cdot \Delta t$$

If m<n, delay every 'low to high' transition relative to the previous 'high to low' transition in at least a part of the message with a time equal to $$\frac{n-m}{2} \cdot \Delta t$$

Wherein Δt is the period of the oversampling signal 35. This operation yields a corrected signal with a duty cycle close to 50%. The numbers n and m may also be derived from more than one cycle of the synch field. If n corresponds to the number of samples during x high states, and m corresponds to the number of samples during x low states, the delays given above become:

$$\frac{m-n}{2x} \cdot \Delta t \quad \text{and} \quad \frac{n-m}{2x} \cdot \Delta t$$

respectively.

Figure 5:
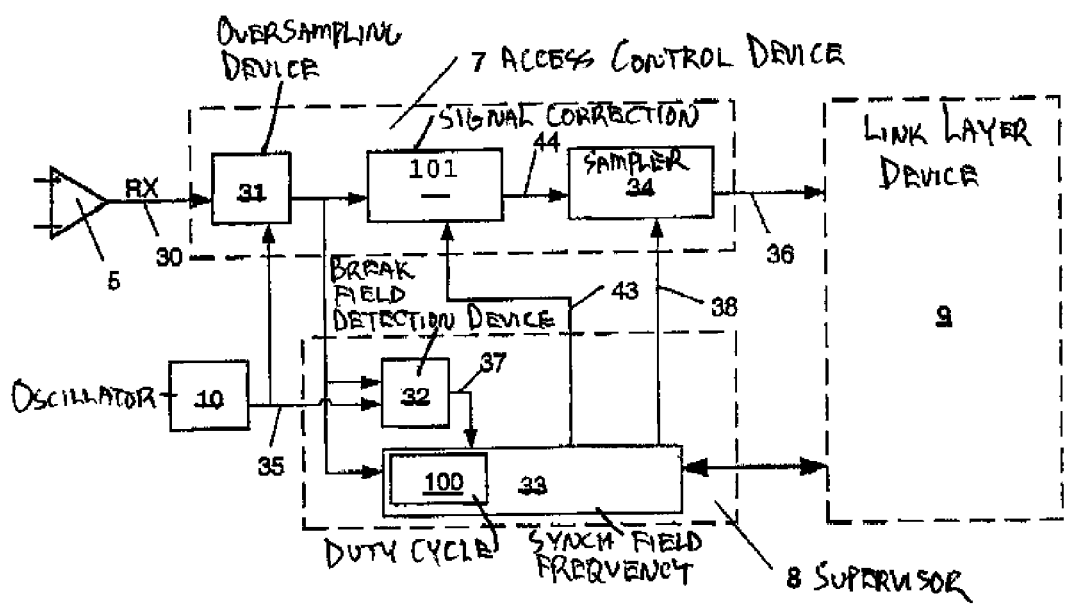
FIG. 5 represents the building blocks of a module according to the invention.

The building blocks adapted to perform these operations according to the invention are shown in FIG. 5. Some of the blocks which are present are the same as in prior art modules, and are numbered in the same way as in FIG. 2b. The invention is characterized by the presence of an additional device 101 in the MAC 7, and by a device 100 present in device 33 in the supervisor device 8. The signal correction, according to the above described algorithm, is performed in device 101, which is placed between devices 31 and 34. Device 33 carries out the same functions as before calculation of sampling frequency, but the device 100 now does the measurement of the duty cycle, equally according to the above described algorithm. The signal 43 represents the result of the measurement, which is transferred from device 33 to device 101. The corrected signal 44, having a duty cycle of close to 50%, is then sampled in device 34, as before, by sample signal 38. The possible errors in the decoding are now almost only dependent on inaccuracies of the oscillator. The accuracy of common RC-oscillators is sufficient for this purpose, when combined with a signal having duty cycle close to 50%. This situation is obtained by the present invention, without necessitating the use of complex and expensive modifications to the transceivers. The higher tolerance for the RC-oscillator enables also the slave to slave communication which was not feasible with the prior-art solution.

The invention is also related to a multiplex bus system having at least one module capable of performing the above steps of measuring the synchronisation field duty-cycle and producing a signal with a duty cycle close to 50%. The invention is equally related to the individual module capable of these steps and to the method applied for treating the incoming signal.

A bus system according to the invention, still corresponds to the FIG. 1. The MAC 7 and the supervisor 8 of these nodes are different from prior art nodes. The modifications to these blocks are depicted in FIG. 5. All other parts may be the same. The supervisor 8 comprises a device 100 for measuring the synch field duty-cycle, and MAC 7 comprises a device 101 for correcting the incoming signal.

The invention claimed is:

1. Method for correcting the duty cycle of a received signal, wherein said signal comprises a synchronization field (22), said synchronization field comprising a number of cycles of a high state followed by a low state or vice versa, said method comprising the steps of:

transforming said signal into a first block wave (30;21 to 24), representing a sequence of high and low states, a high state corresponding to a first binary value, a low state corresponding to a second binary value, oversampling said first block wave with a sample signal (35) having a sample period equal to $\Delta t$, deriving from at least a part of said first block wave, the duty cycle of said first block wave by counting the number of samples, obtained by oversampling and corresponding to a high state and the number of samples, obtained by oversampling and corresponding to a low state in one or more cycles of the incoming signal and, producing a second block wave (44), which represents the same sequence of high and low states as said first block wave, and wherein at least a part of said second block wave has a duty cycle of 50%, after oversampling said first block wave (30;21 to 24) with said sample signal (35), deriving the number of samples (n), obtained by oversampling and corresponding to a predefined number of high states of said synchronization field (22) and the number of samples (m), obtained by oversampling and corresponding to a predefined number of low states of said synchronization field (22), wherein said predefined number is called 'x', calculating from said numbers n and m, the duty cycle of said first block wave (22), if n<m, delaying each high to low transition relative to the previous low to high transition in at least a part of said first block wave (30;21 to 24), with a time equal to $(m-n/2x), \Delta t$, thereby producing said second block wave (44), if n>m, delaying each low to high transition relative to the previous high to low transition in at least a part of said first block wave (30;21 to 24), with a time equal to $(n-m/2x), \Delta t$, thereby producing said second block wave (44).

* * * * *

UNITED STATES PATENT AND TRADEMARK OFFICE
CERTIFICATE OF CORRECTION

PATENT NO.       : 7,636,410 B2
APPLICATION NO.  : 10/360436
DATED            : December 22, 2009
INVENTOR(S)      : Geert Maria Marcel Vandensande It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1919 days.

Signed and Sealed this

Ninth Day of November, 2010

David J. Kappos
*Director of the United States Patent and Trademark Office*